(12) United States Patent
Kobayashi (10) Patent No.: US 6,181,377 B1
(45) Date of Patent: *Jan. 30, 2001

(54) APPARATUS FOR SETTING IMAGING FUNCTIONS BASED ON A DETECTED VIEWPOINT

(75) Inventor: Takashi Kobayashi, Mitaka (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/507,075

(22) Filed: Jul. 26, 1995

(30) Foreign Application Priority Data

Jul. 29, 1994 (JP) .................................................. 6-178567

(51) Int. Cl.[7] .................................................. H04N 5/222
(52) U.S. Cl. ........................ 348/333.02; 348/358; 396/51
(58) Field of Search ..................... 348/333, 334, 348/341, 347, 358, 335, 207, 369, 333.01, 333.02, 333.09, 333.12; 396/51, 85, 86, 87; H04N 5/222

(56) References Cited

U.S. PATENT DOCUMENTS

| 4,574,314 | * | 3/1986 | Weinblatt | 348/333 |
| 5,245,371 | | 9/1993 | Nagano et al. . | |
| 5,365,302 | * | 11/1994 | Kodama | 396/51 |
| 5,541,655 | * | 7/1996 | Kaneda | 348/333 |
| 5,570,156 | * | 10/1996 | Arai et al. | 396/51 |
| 5,579,048 | * | 11/1996 | Hirasawa | 348/333 |
| 5,581,323 | * | 12/1996 | Suzuki et al. | 396/51 |

FOREIGN PATENT DOCUMENTS

| 1241511 | | 9/1989 | (JP) . | |
| 2-32312 | | 2/1990 | (JP) . | |
| 3-87818 | * | 4/1991 | (JP) | G03B/7/00 |
| 5-191683 | | 7/1993 | (JP) | H04N/5/225 |

* cited by examiner

Primary Examiner—Tuan Ho
(74) Attorney, Agent, or Firm—Fitzpatrick, Cella, Harper & Scinto (57) ABSTRACT

An image pickup device displays, on a finder image area, an index mark indicating the wide angle side and the telephoto side of the zooming operations, an index mark indicating the zoom angle setting range in combination with the corresponding focal lengths, and an index mark indicating the current set position. When the photographer watches a desired position of the index mark, the viewpoint is detected by the viewpoint detecting device and the zooming operation is automatically conducted to the focal length corresponding to the viewpoint.

40 Claims, 8 Drawing Sheets

APPARATUS FOR SETTING IMAGING FUNCTIONS BASED ON A DETECTED VIEWPOINT

BACKGROUND OF THE INVENTION

1. Field of the Invention

The present invention relates to viewpoint detecting device.

2. Related Background Art

Imaging equipment such as video cameras have shown remarkable progress in recent years, toward a smaller size and more diversified functions.

Along with such progress, for the purpose of reducing the cumbersome operations associated with such diversified functions and of achieving the operation intended by the operator, there is being introduced the viewpoint detecting device enabling the execution of various functions and the control of various operations by viewpoint of the operator.

Such viewpoint detecting device, for example in case of a camera such as a video camera, enables focusing to a position watched by the operator or functions as a switch for executing any of the functions when a corresponding index mark is watched by the operator.

In the following there will be explained an example of the video camera in which the viewpoint detecting device is utilized for lens focusing and zooming.

The viewpoint detecting device, conventionally equipped in the video camera or the like, has the viewpoint input functions for effecting the zooming operation by selecting zooming marks "TELE" and "WIDE" displayed on the image area of the view finder with the viewpoint and the focusing operation at the watched position of said image area.

Figure 1:
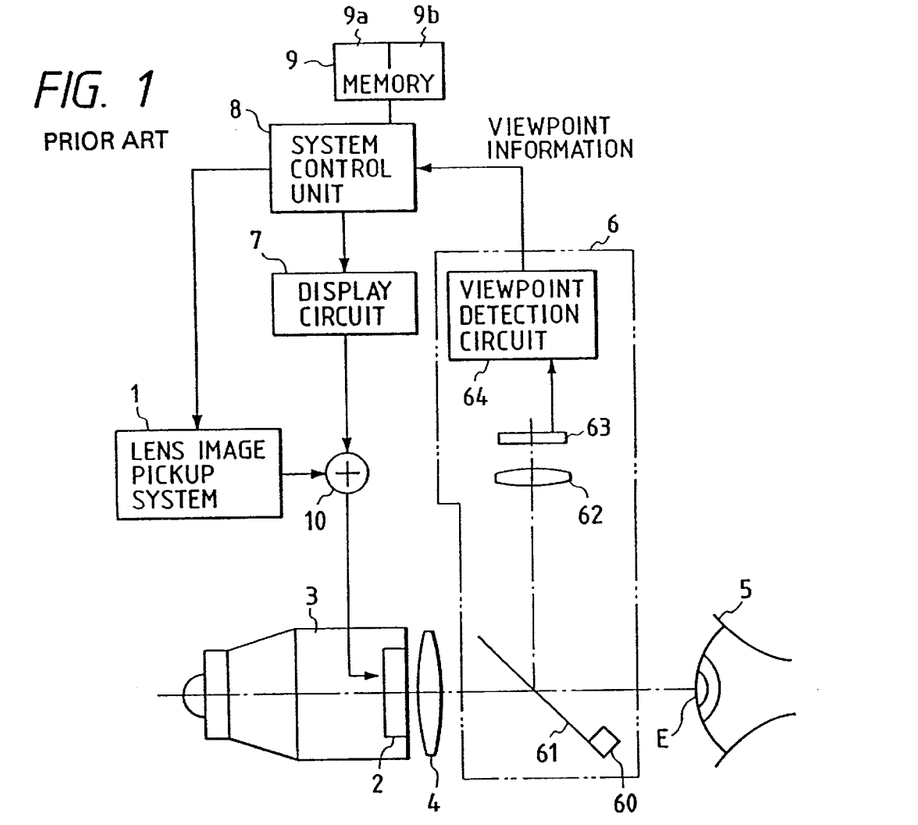
FIG. 1 is a block diagram of a video camera proposed before by the present assignee.

FIG. 1 is a schematic block diagram of a video camera with viewpoint switching function.

The video camera shown in FIG. 1 is provided with a phototaking lens system 1 including a zoom lens for taking the image of an object; a view finder 3 containing a finder image area 2 for observing the object to be taken by the phototaking lens system 1; an eyepiece lens 4 provided in front of the view finder 3; viewpoint detection means 6 for detecting the viewpoint of an eye 5 of the photographer; a display circuit 7 for displaying, on the image area 2, an AF frame approximately showing the focusing area, viewpoint switch marks to be explained later and other information such as tape counter and phototaking mode, required for the photographer; a system control circuit 8 for controlling various parts of the camera; a memory 9 for memorizing the coordinate values of the viewpoint switch marks on the finder image area; and an adder 10 for the outputs of the phototaking lens system 1 and the display circuit 7.

The above-mentioned viewpoint detecting means 6 is provided with an infrared light emitting diode 60 for irradiating the eye 5 of the photographer with infrared light; a dichroic mirror 61 transmitting the visible light but reflecting the infrared light; a condenser lens 62 for condensing the infrared light reflected by said dichroic mirror 61; a photoelectric converting element 63 for converting the infrared light, condensed by said condenser lens 62, into an electrical signal; and a viewpoint detecting circuit 64 for determining the point watched by the photographer on the finder image area, based on the image of the eye 5 of the photographer on said photoelectric converting element 63.

As the dichroic mirror 61 transmits the visible light, the photographer can observe the finder image area 2 through the eyepiece lens 4. Also as the dichroic mirror 61 reflects the infrared light, the reflected image of the eye 5, irradiated by the infrared light emitting diode 60, is condensed by the condenser lens 62 and focused on the photoelectric converting element 63.

The viewpoint detecting circuit 64 determines the viewpoint of the photographer on the finder image area 2, based on the image of the eye 5 on the photoelectric converting element 63, according to the above-mentioned principle or an algorithm disclosed in the Japanese Patent Laid-open Application Nos. 1-241511 and 2-32312.

In the following there will be explained the functions of the viewpoint switch provided in the view finder of the present conventional video camera.

Figure 2:
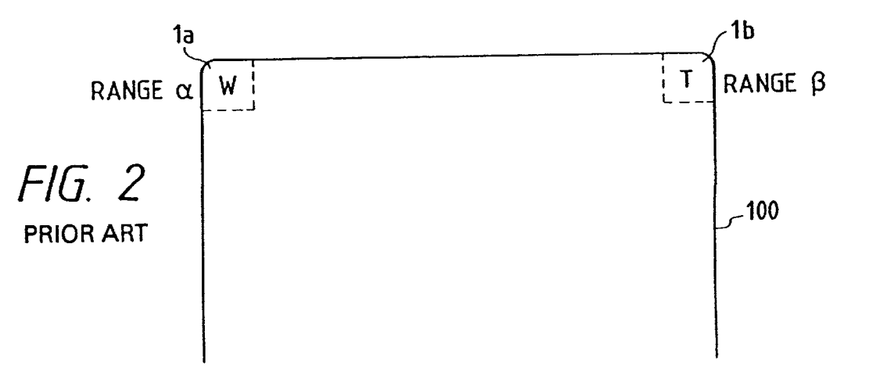
FIG. 2 is a schematic view showing an example of display on a finder image area of the video camera shown in FIG. 1.

An example of the display on the finder image area is schematically shown in FIG. 2.

On the finder image area 100, there is displayed a menu consisting of index marks 1a, 1b represented by letters "W" and "T" and indicating mutually different operations. For example "W" indicates the zooming operation toward the wide angle side, while "T" indicates that toward the telephoto side. A numeral "902" at the lower right corner indicates, for example, a date.

Figure 3:
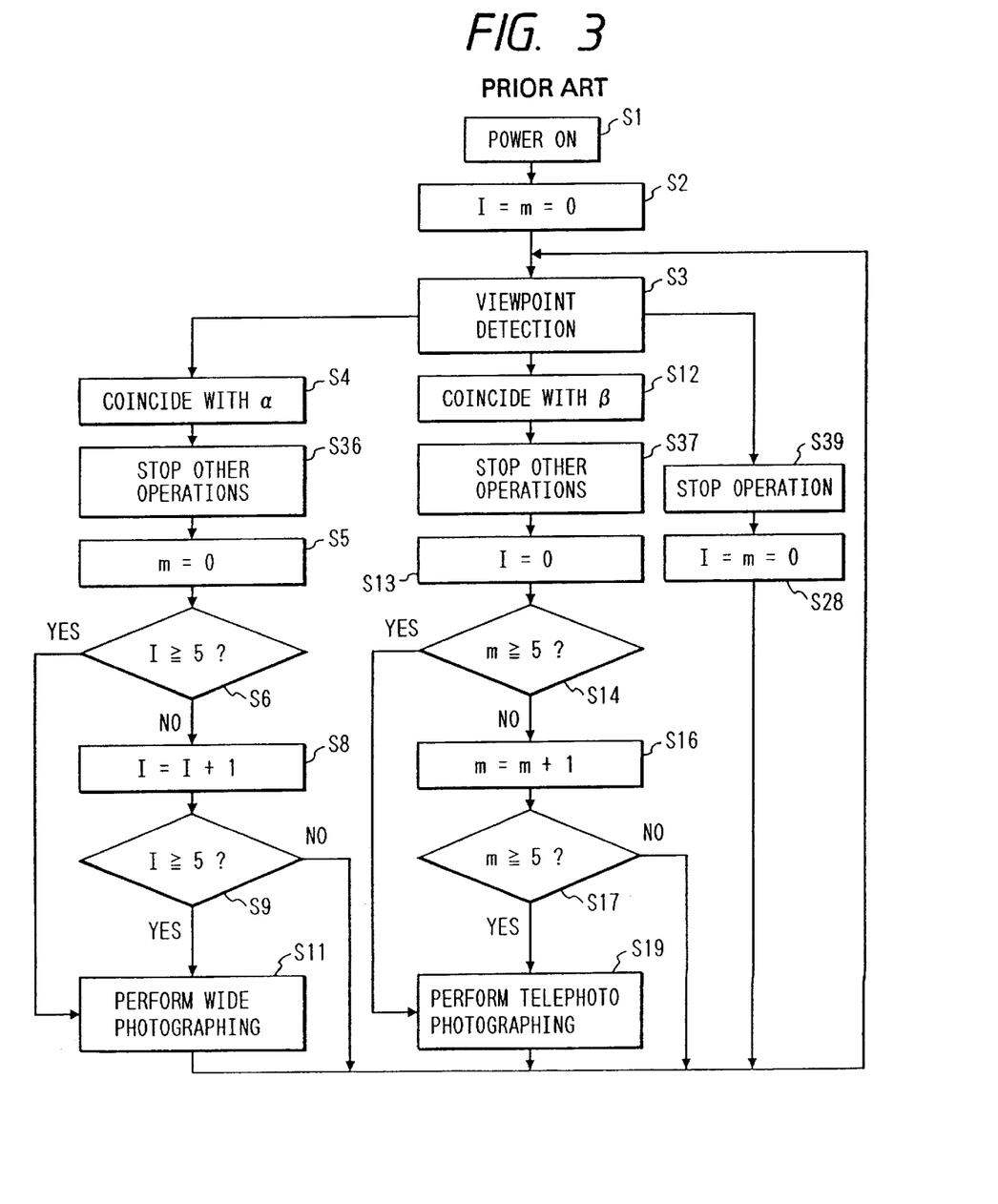
FIG. 3 is a flow chart showing the control sequence of the video camera shown in FIGS. 1 and 2.

Now reference is made to a flow chart shown in FIG. 3, for explaining the zooming operation utilizing the viewpoint detection. Groups of coordinates of predetermined ranges including the visual switch index marks are memorized in a memory, and each group includes all the coordinates within the range of each index mark shown in FIG. 2. These groups are represented for example by $\alpha$ and $\beta$ respectively for the wide angle side and the telephoto side. At first, when the power supply to the video camera is turned on (step S1), variables l and m are reset to zero (step S2), whereby the viewpoint switches are made ready. The variables l, m respectively indicate the numbers of coincidences of the watching point of the photographer with any of the coordinates of the groups $\alpha$ and $\beta$. While the photographer looks into the view finder and the viewpoint detection is executed properly (step S3), the system control circuit 8 continuously receives the coordinate of the watching point of the photographer on the finder image area from the viewpoint detecting means 6.

In the following there will be explained, as an example, the functions when the photographer watches the wide angle index mark "W" in the finder image area. When the coordinate of the viewpoint coincides with any of the coordinates in the group $\alpha$ (step S4), the system control circuit 8 terminates any function other than the zooming operation toward the wide angle side (S6), then resets the variable m to 0 (S5), discriminates whether the variable l is equal to or larger than a predetermined number (5 in the present example) (S6), and, if less, adds 1 to l (S8). Then there is again discriminated whether l is equal to or larger than 5 (S9), and, if less, the sequence returns to the step S3 to receive the coordinate of the viewpoint from the viewpoint detecting circuit 64.

On the other hand, if the step S9 identifies that l is equal to or larger than 5, the zoom lens is shifted toward the wide angle side, and the sequence then returns to the step S3 to receive the coordinate of the viewpoint again. If the step S6 identifies that l is equal to or larger than 5, the sequence jumps to a step S11. Even when the coordinate of the viewpoint coincides with any of the coordinates in the group $\alpha$, if the coordinate of the viewpoint moves outside the group $\alpha$ before the number of coincidences reaches 5, the variable l is reset to zero (steps S13, S28). When the index mark "T" is looked at, a similar procedure is also executed.

In the above-explained configuration, however, the photographer is required to continue to look at the mark "W" for zooming toward the wide angle side or the mark "T" for zooming toward the telephoto side until the image angle reaches a value desired by the photographer by the zooming, so that the photographer becomes tired.

The above-mentioned drawback is not limited to the zooming operation but is associated with any analog adjustment of the function, and is commonly encountered in a control system utilizing the viewpoint detecting device.

SUMMARY OF THE INVENTION

In consideration of the foregoing, a first object of the present invention is to provide a viewpoint detecting device capable of alleviating the fatigue of the photographer, resulting from continued watch of the index mark.

The above-mentioned object can be attained, according to a preferred embodiment of the present invention, by a viewpoint detecting device comprising display means for displaying index marks, showing settable ranges of a predetermined function, on a monitor image area; viewpoint detecting means for detecting one, on which the photographer's viewpoint is, of said index marks indicating the settable ranges; and setting means for setting said function at a state corresponding to the detected viewpoint.

Also according to another preferred embodiment, there is provided a viewpoint detecting device comprising display means for displaying index marks, showing settable ranges of a phototaking function and an index mark indicating the set state thereof on a monitor image area; viewpoint detecting means for detecting one, on which the photographer's viewpoint is, of said index marks indicating the settable ranges; and setting means for setting said function at a state corresponding to the detected viewpoint and transmitting said set state to said display means.

A second object of the present invention is to provide a viewpoint detecting device capable of setting adjustment means at an arbitrary adjustment state by the viewpoint.

A third object of the present invention is to provide an adjustment device provided with a viewpoint detecting device, capable of setting adjustment means at an arbitrary adjustment state by the viewpoint, wherein the displacement of the adjustment means to the thus set state can be conducted independently from the watching operation.

The above-mentioned objects can be attained, according to a preferred embodiment of the present invention, by a viewpoint detecting device comprising display means for displaying an adjusting scale of adjustment means for effecting a predetermined adjustment; viewpoint detecting means for detecting the position of the viewpoint of the operator; memory means for detecting, by means of said viewpoint detecting means, the viewpoint of the operator on said adjusting scale and memorizing the adjustment position corresponding to the viewpoint on said adjusting scale; and control means for displacing said adjustment means to said adjustment position memorized in said memory means with a predetermined velocity independent from said viewpoint.

A fourth object of the present invention is to provide an adjustment device utilizing viewpoint detecting means capable of memorizing the viewpoint on a scale in a monitor image area and displacing the adjustment means to the adjustment position with a velocity optimum for said adjustment means.

The above-mentioned object can be attained, according to a preferred embodiment of the present invention, by an adjustment device utilizing a viewpoint detecting device, comprising display means for displaying an adjusting scale of adjustment means for effecting a predetermined adjustment; viewpoint detecting means for detecting the position of the viewpoint of the operator; memory means for memorizing the adjustment position on said adjusting scale, corresponding to a viewpoint, in case said viewpoint detecting means detects that said viewpoint is on said adjusting scale at least for a predetermined time; and control means for displacing said adjustment means to said adjustment position memorized in said memory means, over a time longer than said predetermined time.

A fifth object of the present invention is to provide an image pickup device utilizing the above-mentioned adjustment device utilizing the viewpoint detecting means.

Still other objects of the present invention, and the features thereof, will become fully apparent from the following description, which is to be taken in conjunction with the attached drawings.

DETAILED DESCRIPTION OF THE PREFERRED EMBODIMENTS

In the following there will be given a detailed explanation on an embodiment in which the viewpoint detecting device of the present invention and the adjustment device utilizing such a viewpoint detecting device are applied to a video camera.

At first there will be explained the principle of viewpoint detection in the viewpoint detecting device.

Figure 4A:
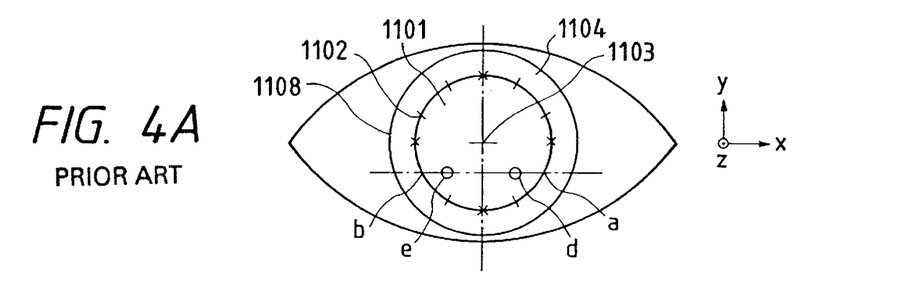
FIGS. 4A to 4D are views showing the principle of viewpoint detection.
Figure 4B:
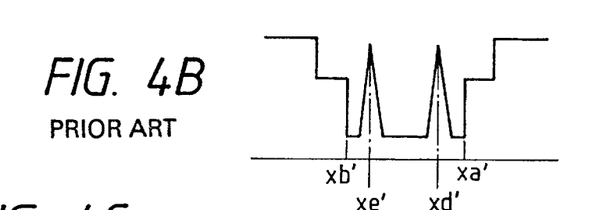
Figure 4C:
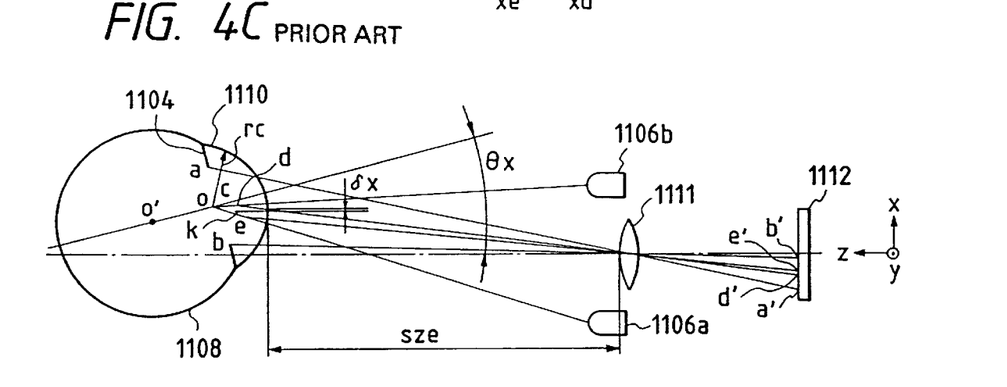
Figure 4D:
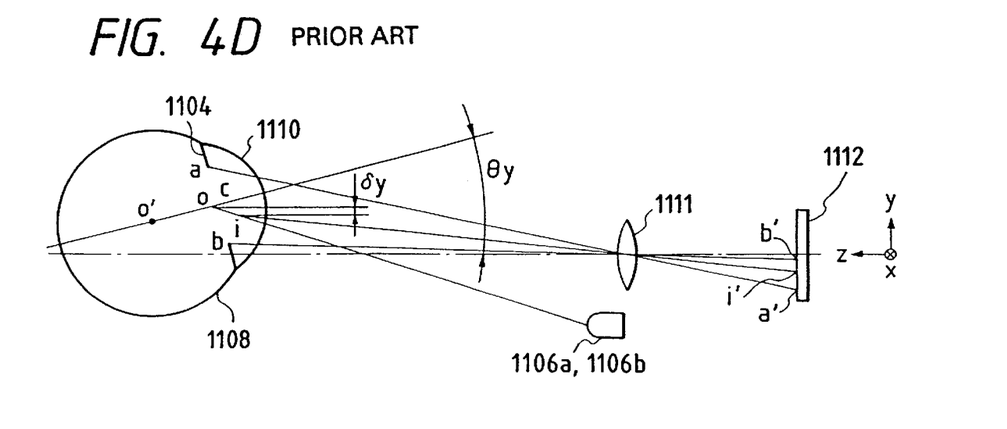

FIGS. 4C and 4D are respectively a plan view and a lateral view showing the principle of viewpoint detection.

Light sources 46a, 46b composed for example of infrared light emitting diodes (IRED), emitting infrared light insensitive to the observer, are positioned substantially symmetrically in the x (horizontal) direction with respect to the optical axis of an imaging lens 51 (cf. FIG. 4C) and somewhat lower in the y (vertical) direction (cf. FIG. 4D) and effect diverging illumination on the eye of the observer. A part of the illuminating light reflected by the eye 48 is focused by the imaging lens 51 onto an image sensor 52. FIG. 4A approximately shows the image of the eye projected on the image sensor 52, and FIG. 4B is a chart showing the output intensity of the image sensor 52.

Now the principle of viewpoint detection will be explained with reference to these drawings.

At first, in the horizontal plane, the infrared light emitted from the light source 46b illuminates, as shown in FIG. 4C, the cornea 50 of the eye 48 of the observer. A corneal reflected image d (false image) formed by the infrared light reflected on the surface of the cornea 50 is condensed by the imaging lens 51 and is focused on a position d on the image sensor 52. Similarly the infrared light from the light source 46a illuminates the cornea 50 of the eye, and a corneal reflected image e (false image) formed by the infrared light reflected on the surface of the cornea 50 is condensed by the imaging lens 51 and is focused at a position e' on the image sensor 52.

Also light beams from end portions a, b of the iris 44 (FIG. 4A) are focused, through the imaging lens 51, at positions a', b' on the image sensor 52. In case the rotation angle θ of the optical axis of the eye 48 is small relative to the optical axis of the imaging lens 51, there can be determined, on the image sensor 52, a plurality of the x-coordinates xa, xb of the end portions a, b of the iris 44, as indicated by marks x in FIG. 4A. Thus, the center xc of the pupil is calculated, utilizing the minimum square method on a circle.

On the other hand, the rotation angle θx of the eye 48 relative to the optical axis can be represented as follows, utilizing the x-coordinate xo of the center o of the curvature of the cornea 50:

$$oc*\sin θx = xc - xo \quad (1)$$

Also xo can be determined in the following manner, in consideration of a predetermined correction value δx at the center k of the corneal reflected images d and e:

$$xk = (xd + xe)/2$$

$$xo = (xd + xe)/2 + δx \quad (2)$$

δx is a value geometrically determined from the method of installation of the device, distance to the eye etc. but the method of such determination will not be explained further.

By substituting (1) in (2), θx can be determined as:

$$θx = \arcsin[[xc - \{(xd + xe)/2 + δx\}]/oc] \quad (3)$$

Also the coordinates of the feature points projected on the image sensor can be defined, with suffix ', as follows:

$$θx = \arcsin[[xc' - \{(xd' + xe')/2 + δx'\}]/oc/β] \quad (4)$$

wherein β is a magnification determined by the eye distance size to the imaging lens 51 and obtained in practice as a function of the distance |xd'−xe'| of the corneal reflected images.

In the vertical plane, there is obtained a configuration as shown in FIG. 4D. The corneal reflected images formed by the two IRED's 46a, 46b are in a same position i. The rotation angle θy of the eye 48 can be calculated in a similar manner as in the horizontal plane, except for the equation (2) which is replaced by the following equation (5) defining the y-coordinate yo of the center o of curvature of the cornea:

$$yo = yi + δy \quad (5)$$

wherein δy is a value determined geometrically from the method of installation of the device, the distance to the eye etc. but the method of such determination will not be explained further. Thus the rotation angle θy in the vertical direction can be represented as:

$$θy = \arcsin[[yc' - (yi' + δy')]/oc/β] \quad (6)$$

wherein yc' is the vertical coordinate of the center of the pupil on the image sensor.

Also the coordinate (xn, yn) of a position on the finder image area of the video camera can be defined, with a constant m determined by the view finder optical system, as follows in the horizontal and vertical planes:

$$xn = m*\arcsin[[xc' - \{(xd' + xe')/2 + δx'\}]/oc/β] \quad (7)$$

$$yn = m*\arcsin[[yc' - \{(yi' + δy')]/oc/β] \quad (8)$$

As will be apparent from FIGS. 4A and 4B, the detection of the pupil edges utilized an upshift (xb') and a down-shift (xa') of the output waveform of the image sensor. Also the coordinates of the corneal reflected images are determined by sharp upshifts (xe', xd').

In the following there will be explained the configuration and function of the video camera of the present embodiment.

Figure 5:
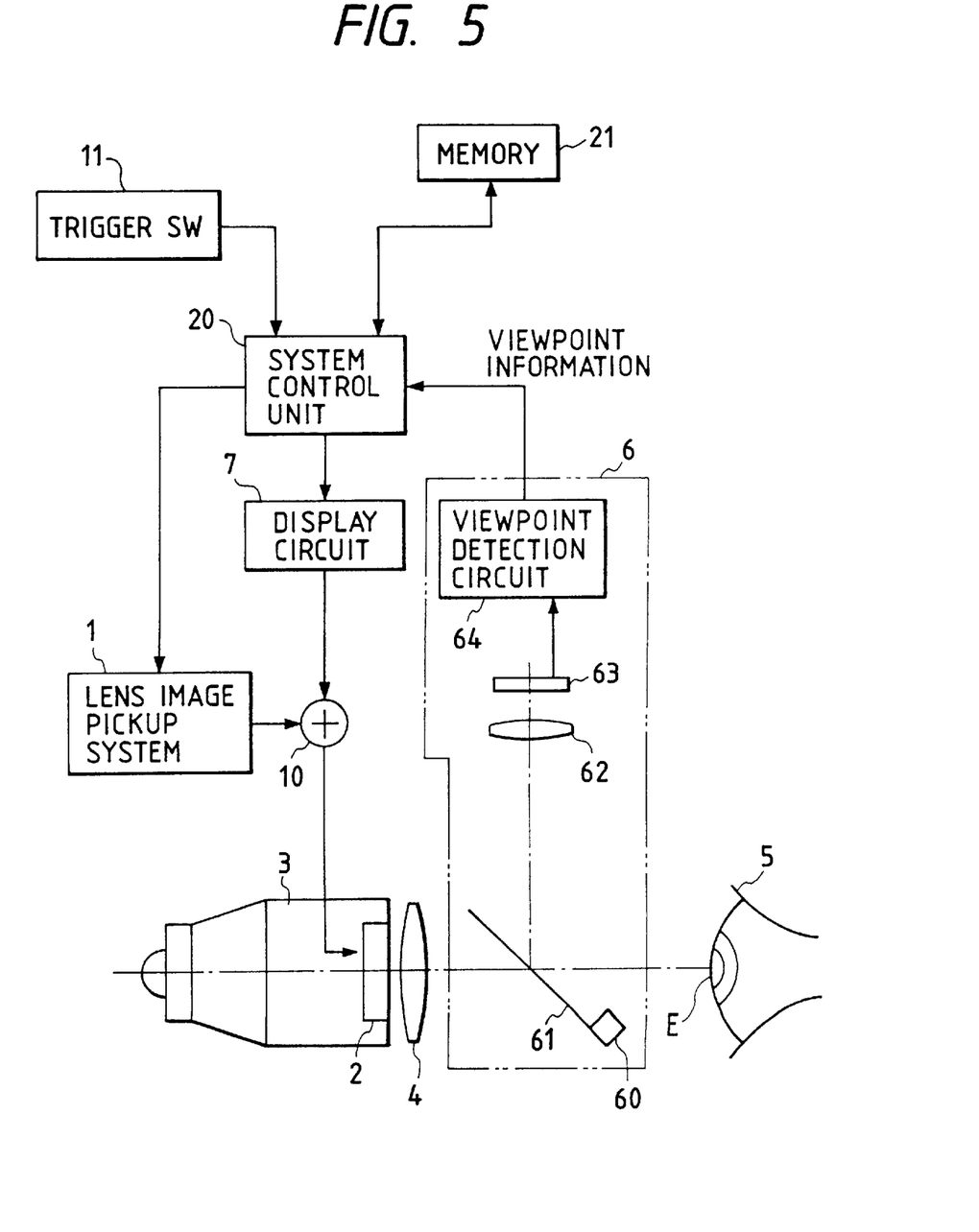
FIG. 5 is a block diagram of a video camera constituting an embodiment of the present invention.

FIG. 5 shows the configuration of the video camera of the present embodiment, wherein components the same as those shown in FIG. 1 are represented by the same symbols and will not be explained further. In brief, the configuration shown in FIG. 5 is different from that in FIG. 1 in the process of the system control circuit 20 and the function of the memory 21.

In FIG. 5, there is additionally provided a trigger switch 11 for controlling the start and stop (stand-by) of the phototaking operation.

Figure 6:
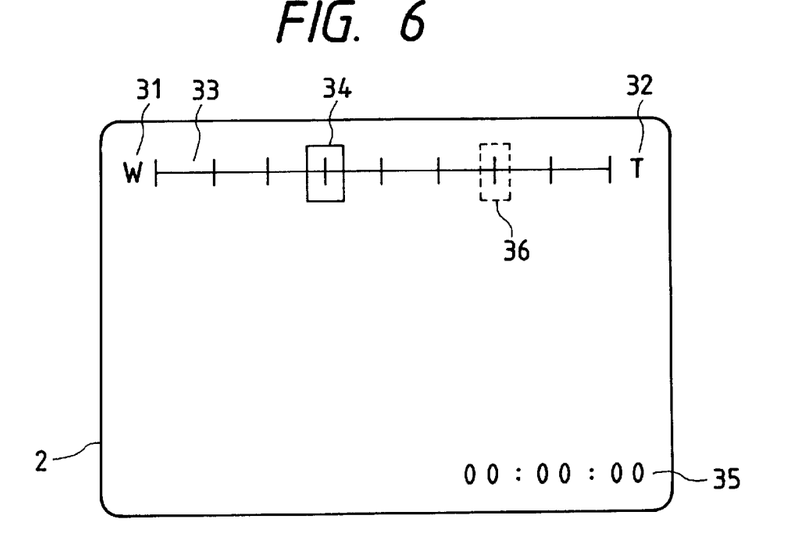
FIG. 6 is a schematic view showing an example of a display on the finder image area of the video camera of the above-mentioned embodiment.

FIG. 6 shows an example of the display on the finder image area, wherein an index mark 31 indicates the wide angle side "W" of zooming while an index mark 32 indicates the telephoto side "T" of zooming. A mark 33, consisting of a horizontal line with short vertical lines is a scale representing the settable positions of zooming and indicating that the image angle can be set, in addition to the wide angle end and the telephoto end, at seven positions therebetween. If the focal lengths at the wide angle end and the telephoto end are respectively, for example, 6 mm and 54 mm, a section between the neighboring short vertical lines corresponds to a difference of 6 mm in the focal length. A mark 34 indicates the currently selected zooming image angle. In the example shown in FIG. 6, the mark 34 is at the third short line from the wide angle end, corresponding to a focal length of 24 mm. A number 35 at the lower right corner does not have the switching function but merely indicates, for example, a date.

The memory 21 in FIG. 5 stores the coordinates, on the finder image area 2, of the above-mentioned index mark 33 in 9 positions, or the wide angle end and the telephoto end and 7 interim positions.

In the following there will be explained the zooming process by the system control circuit 20, with reference to a flow chart shown in FIG. 7. After the process is initiated (S101), there is repeated a discrimination whether the trigger switch has been depressed (S102). When the trigger switch 11 is depressed, the coordinate of the viewpoint on the finder image area 2 in this state is obtained from the viewpoint detecting circuit 64 (S103). Also at this point the display position of the mark 34 is moved to the coordinate of the viewpoint. The coordinate of thus obtained viewpoint corresponds to the image angle selected by the photographer. Thus said coordinate is compared with the coordinates memorized in advance in the memory 21, whereby the focal length represented by the mark watched by the photographer is identified (S104). Then the phototaking lens system is driven to the thus identified focal length (S105). The system control circuit 20 is utilized as the setting means.

Figure 8:
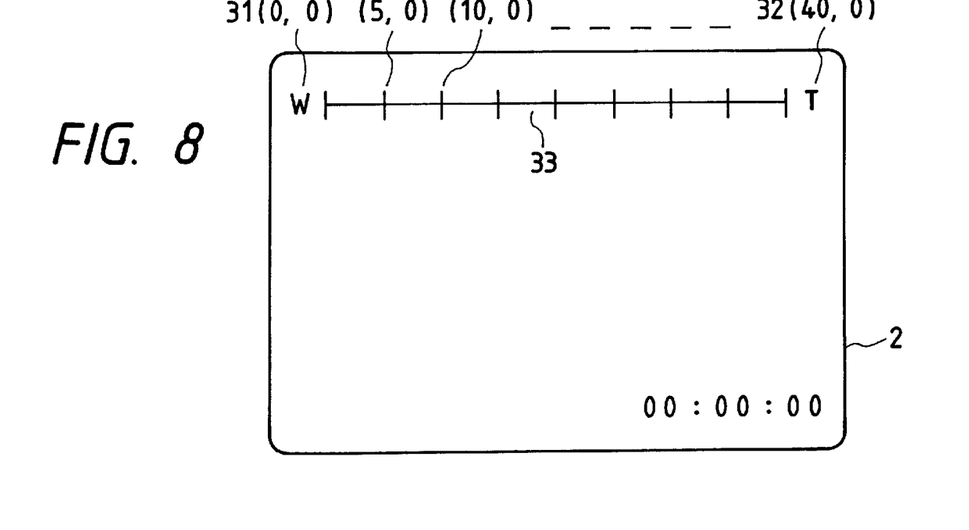
FIG. 8 is a schematic view showing index marks according to the present invention.

FIG. 8 shows an example of the relationship between the index mark 33 indicating the settable zoom positions and the coordinates of the portions representing the aforementioned 9 focal lengths. Starting from a coordinate (0, 0) of the mark 31 indicating the wide angle end "W", there are defined, toward the right, 9 coordinates to a coordinate (40, 0) of the mark 32 indicating the telephoto end "T".

Figure 9:
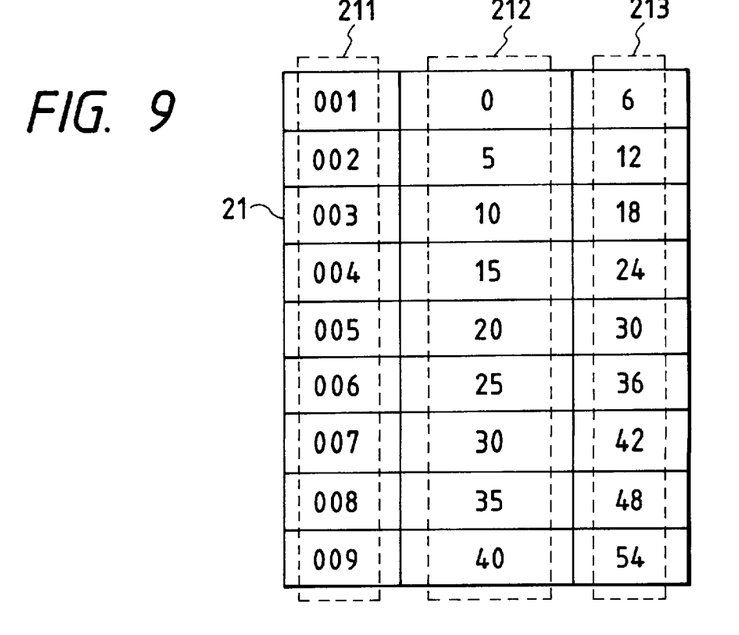
FIG. 9 is a map of a memory to be employed in the present invention.

FIG. 9 shows an example of the coordinates and focal lengths memorized in the memory 21. A memory area 211 contains 9 addresses from 001 to 009. Each address has two information areas 212 and 213. The portion 212 stores 9 coordinates in the lateral direction only, and the portion 213 stores the focal lengths respectively assigned to the coordinates.

Figure 7:
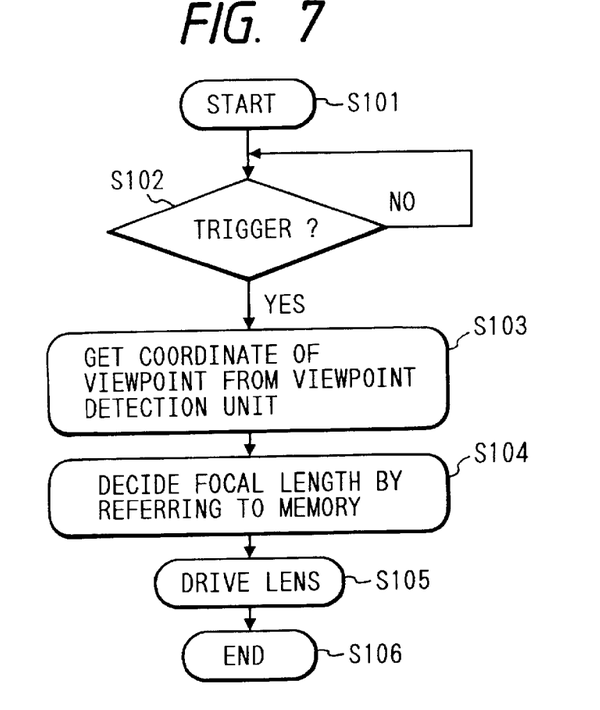
FIG. 7 is a flow chart showing the control sequence in a first embodiment of the present invention.
Figure 10:
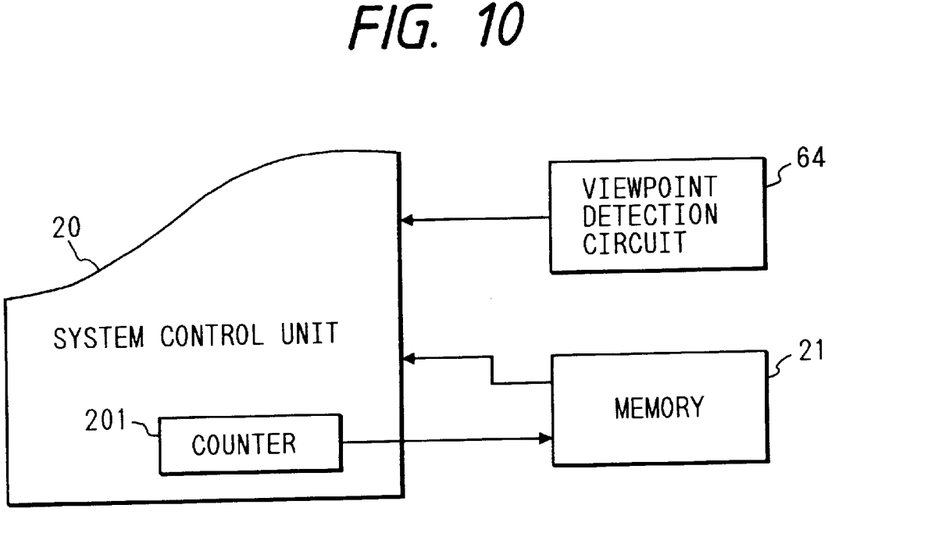
FIG. 10 is a block diagram showing an example of system control means to be employed in the present invention.

Now reference is made to FIG. 10 for effecting the discrimination in the step S104 in FIG. 7. Referring to FIG. 10, a counter 201 provided in the system control circuit 20 generates addresses in succession from 001 to 009, and the coordinate values respectively corresponding to these addresses are supplied in succession from the memory 21 to the system control circuit 20. In case of coincidence with the coordinate value entered from the viewpoint detecting means 64, there is obtained a focal length stored in the address of such coinciding coordinate.

The phototaking lens system 1 is set at the thus determined focal length by providing the phototaking lens system 1 with so-called zoom encoder for detecting such 9 zoom positions and driving the phototaking lens system 1 in such a manner that the output of the encoder becomes equal to a value corresponding to the focal length obtained by the system control circuit 20.

In the above-explained configuration of the first embodiment, after the depression of the trigger switch 11, the zoom lens can be set at the desired focal length without continued watch of the photographer at the index mark.

Figure 11:
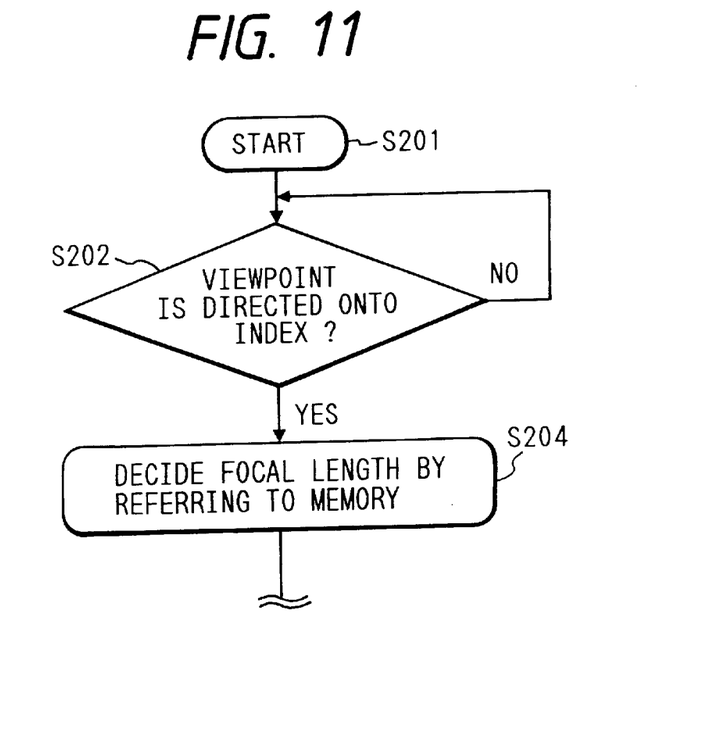
FIG. 11 is a flow chart showing the control sequence in a second embodiment of the present invention.

In the foregoing first embodiment, the image angle of the zoom lens starts to change after the depression of the trigger switch 11 by the photographer, but it is also possible, as soon as the photographer watches any part of the aforementioned index mark 33 indicating the settable zoom position, to set the zoom lens at an image angle corresponding to the coordinate of thus watched part. FIG. 11 is a flow chart showing the control sequence in such case.

When the sequence is initiated (S201), the system control circuit 20 discriminates whether the coordinate obtained from the viewpoint detecting circuit 64 coincides with any of the 9 zoom setting positions of the index mark 32 shown in FIG. 6 (S202), and, if the watched point coincides with any of these setting positions, the focal length corresponding to the coordinate of the watched point is obtained from the memory 21. The sequence thereafter is the same as the steps S104 to S106 in the first embodiment, shown in FIG. 7.

This second embodiment allows the operator to set the zoom lens at a desired focal length, by merely watching the index mark 203 corresponding to the desired focal length for a short time, instead of continued watch.

In the following there will be explained, in combination with the state of actual use, an embodiment in which the viewpoint detecting device of the present invention is applied to a video camera.

Figure 12:
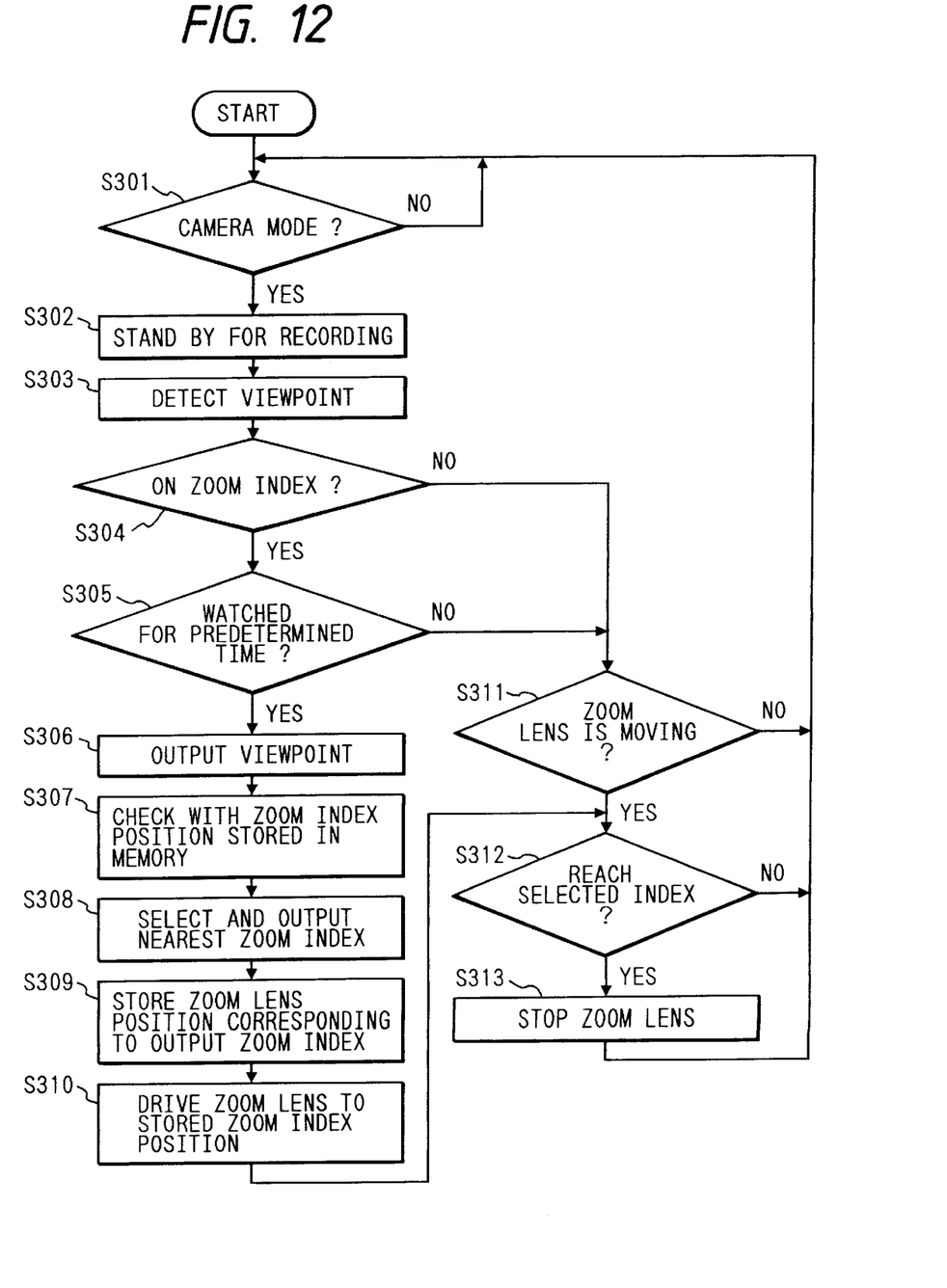
FIG. 12 is a flow chart of a third embodiment of the present invention.

The video camera of the present embodiment is similar, in configuration, to that shown in FIG. 5, but is different in the process executed in the system control circuit 20. FIG. 12 is a flow chart showing the process executed in the system control circuit 20.

When the sequence is initiated, a step S301 discriminates whether the video camera is in the camera mode, and, if it is in the camera mode, the sequence proceeds to a step S302, but, if not (in case of playback or recording of the external input in the VCR mode), the video camera enters the stand-by state.

In case the step S301 confirms that the video camera is in the camera mode, a step S302 activates the image pickup device, the signal processing circuits of the phototaking system, the electronic view finder and the lens systems and also activates the viewpoint detecting circuit, whereby the video camera enters the recording stand-by state. Thus the scale indicating the movable range of the zoom lens and the current position thereof are displayed in the finder image area.

When the operator looks into the electronic view finder in this state, the viewpoint of the operator is detected (S303).

Then a step S304 discriminates whether the detected viewpoint in the image area is on the scale, indicating the movable range of the zoom lens, as shown in FIG. 6, and, if it is on said scale or not, the sequence respectively proceeds to a step S305 or S311.

The step S305 discriminates whether a position on the scale is watched for a predetermined time, and, if watched, the sequence proceeds to a step S306 to release the coordinate of the viewpoint which has been watched for the predetermined time. If the step S305 cannot confirm the watch for the predetermined time, the sequence proceeds to the step S311.

The coordinate of the viewpoint obtained in the step S306 is compared in succession, in a step S307, with the coordinates of the gradations of the scale of the movable range of the zoom lens, stored in the memory 21, and a step S308 identifies and releases the coordinate of a stored position closest to the coordinate of the viewpoint. In this state an index mark representing the target position of the zoom lens is displayed as shown by 36 in FIG. 6.

A step S309 memorizes, as the target value for lens movement, the zoom lens position (focal length) corresponding to the coordinate released in the step S308, and a step S310 drives the zoom lens to the thus memorized target position of the zoom lens. In this manner the zoom lens can be driven to the position designated by the viewpoint on the scale indicating the movable range of the zoom lens. Along with the movement of the zoom lens, the index mark 34 indicating the current position of the zoom lens moves, so that the operator can confirm the moving state of the zoom lens.

The zoom lens is moved to the position designated by the viewpoint with a speed optimum for the zooming operation, regardless of the period of watching of the scale.

Thus the zoom lens does not instantaneously move to the designated position but is so controlled as to effect a natural zooming operation.

In the foregoing there has been explained an optical zooming operation with a zoom lens, but the zooming operation with the optimum speed can be achieved also in case of electronic zooming in which the image angle is changed electronically.

After the zoom lens drive in the step S310, a step S312 discriminates whether the selected target position of the zoom lens has been reached, and, if reached, a step S313 stop the zoom lens and the sequence returns to the step S301. When the zoom lens reaches the target position and is stopped, the mark 34 is also stopped and the mark 36 of the target position is extinguished.

If the step S312 identifies that the zoom lens has not reached the target position of zoom lens movement, the sequence moves to the step S301 to repeat the above-explained procedure, and the zoom lens is continuously driven until the step S312 confirms that the selected target position of the zoom lens movement has been reached.

On the other hand, in case the discrimination of the step S304 turns out negative, indicating that the viewpoint of the operator is not present on the scale indicating the movable range of the zoom lens, the sequence proceeds to a step S311 to discriminate whether the zoom lens is in movement, and, if not, the sequence moves to the step S301 and the zoom lens drive is not conducted until the selection is made again by the viewpoint.

On the other hand, in case the step S311 identifies that the zoom lens is in movement, the sequence proceeds to a step S312 to continue the drive until the current target position is reached.

Thus, the above-mentioned sequence is to continue the drive of the zoom lens to the set target position once the drive of the zoom lens is started by the watch of a desired position on the movable range scale of the zoom lens, even if the viewpoint of the operator is thereafter shifted from the scale. Thus, once designating the target position of the zoom lens, the operator need not continue to look at the scale, and the zoom lens is moved to the target position with the optimum speed for the zooming operation.

On the other hand, if the step S306 identifies that the watch has not continued for the predetermined time, the sequence proceeds to the step S311, and, if the zoom lens is in movement, the zoom lens is driven to the designated target position.

According to the above-explained procedure, once the operator has designated the target position of the zoom lens on the scale, such target position is not changed even if the viewpoint is shifted to another position on the scale, unless the watch is continued for the predetermined time.

On the other hand, even after the setting of the target position for zoom lens movement and during the zoom lens movement to said target position, the target position can be renewed through the steps S305 to S309 by watching another position on the scale for the predetermined time, whereby the zoom lens can be moved to the new target position.

According to the present embodiment, as explained in the foregoing, by watching a desired position on the scale, the zoom lens can be driven to a position or a focal length corresponding to the watched position, and, after the setting of the target position, the zoom lens can be driven to said target position, even if the viewpoint is shifted from the scale. Also even during the movement of the zoom lens, the target position of the zoom lens can be changed by watching another position on the scale.

In either case, the operator is not required to continue to watch the scale during the zoom lens movement, and the zoom lens is driven with the optimum speed for the zooming operation.

The foregoing embodiment, as explained in the foregoing, is so constructed as to display, on the finder image area, an index mark indicating the settable range of the phototaking function, to detect the viewpoint of the operator watching the index mark and to set the phototaking function at a range corresponding to the detected viewpoint. Thus the operator can automatically obtain a desired set state of the functions such as zooming by merely watching a desired setting range displayed on the finder image area, wherein the operator is not required to continue to watch the index mark so that the fatigue of the operator can be alleviated.

Also, the foregoing embodiment is so constructed as to display, on the finder image area, an index mark indicating the settable range of the phototaking function and the set state thereof, to detect the viewpoint of the operator on the index mark indicating the settable range, to set the phototaking function in a setting range corresponding to the detected viewpoint and to display the set state of said function on the finder image area. Thus the operator can automatically obtain a desired set state of the function such as zooming by merely watching a desired setting range displayed on the finder image area, wherein the operator is not required to continue to watch the index mark so that the fatigue of the operator can be alleviated, and the operator can easily know the current set state as it is also displayed.

The present invention is not limited to the foregoing embodiments but is naturally applicable to other equipment as an adjusting device utilizing the viewpoint detection.

It is also possible to achieve an operation similar to the conventional analog knob adjustment by the viewpoint, without the necessity of continued watch on the index mark.

What is claimed is:

1. An image processing device comprising:
   (A) display means for displaying, on a monitor image area, an index mark indicating a variable range of control values of a predetermined function;
   (B) viewpoint detecting means for detecting the position of the viewpoint of the operator in said image area; and
   (C) control means for, when said viewpoint is detected on said index mark by said viewpoint detecting means, converting the position information of the detected viewpoint on the index mark into driving information, and for driving said predetermined function according to the driving information regardless of a change of the viewpoint and without a manual command.

2. An image processing device according to claim 1, wherein said control means is adapted to set the target state of said predetermined function corresponding to a position on the index mark where said viewpoint detecting means identifies that the viewpoint remains fixed at least for a predetermined time.

3. An image processing device according to claim 2, wherein said control means is adapted to effect a varying operation for the target state of said function, irrespective of the predetermined time for the detection of said viewpoint.

4. An image processing device according to claim 1, wherein said monitor comprises an electronic view finder.

5. An image processing device according to claim 3, wherein said index mark comprises a scale indicating said settable range, plural settable positions and the current set position of said function.

6. An image processing device according to claim 5, wherein said predetermined function comprises zoom lens driving means, and wherein said index mark indicates the variable range of the focal length of said zoom lens.

7. An image processing device according to claim 5, further comprising:
   a memory which stores the information on said settable range and on the plural settable positions within said settable range, together with control values for setting functions respectively corresponding to said positions.

8. An image pickup device comprising:
   A) display means for displaying, on a monitor image area, an index mark indicating a variable range of control values of a predetermined function;

B) viewpoint detecting means for detecting the position of the viewpoint of the operator in said image area; and C) control means adapted, when said viewpoint is detected on said index mark by said viewpoint detecting means, for storing position information of the detected viewpoint on the index mark as a control target value, and for converting the position information into driving information and driving said predetermined function according to the driving information at a predetermined speed and without a manual command, and for causing said display means to display the set state of said predetermined function.

9. An image pickup device according to claim 8, wherein said control means is adapted to set the target driving value of said predetermined function corresponding to a position on the index mark where said viewpoint detecting means identifies that the viewpoint remains fixed at least for a predetermined time.

10. An image pickup device according to claim 9, wherein said control means is adapted to effect a varying operation for the target driving value of said function, irrespective of the predetermined time for the detection of said viewpoint.

11. An image pickup device according to claim 8, wherein said monitor comprises an electronic view finder.

12. An image pickup device according to claim 10, wherein said index mark comprises a scale indicating said variable range, plural settable positions and the current set position of said function.

13. An image pickup device according to claim 12, wherein said predetermined function is zoom means, and said index mark indicates the magnification of said zoom means.

14. An image pickup device according to claim 10, further comprising:

a memory which stores the information on said settable range and on the plural variable positions within said settable range, together with control values for setting functions respectively corresponding to set positions.

15. An adjustment device comprising:

A) adjustment means for effecting a predetermined adjustment;

B) display means for displaying, on a monitor image area, an index mark indicating an adjustment range of said adjustment means;

C) viewpoint detecting means for detecting a position of the viewpoint of the operator in said monitor image area;

D) target setting means adapted, when the viewpoint is detected on said index mark by said viewpoint detecting means, for setting and storing a target adjustment value of said adjustment corresponding to the viewpoint on said index mark; and E) control means for converting the target adjustment value into an adjustment amount of said adjustment means and driving said adjustment means according to the adjustment amount, even when the viewpoint detected by said viewpoint detecting means is no longer on said index mark.

16. An adjustment device according to claim 15, further comprising a memory storing plural adjustment states assumable by said adjustment means within said adjustment range and information on the positions on the index mark respectively corresponding to said adjustment states, in a mutually corresponding manner;

wherein said target setting means is adapted to compare the position, on said index mark, of the viewpoint of the operator identified as fixed for at least a predetermined time by said viewpoint detecting means, with the information on said positions stored in said memory, and to set an adjustment state corresponding to the information of a matching position as a target adjustment state.

17. An adjustment device according to claim 16, wherein said control means is adapted, in varying the adjustment state of said adjustment means to said target adjustment state, to effect said variation with a predetermined speed irrespective of the position of the viewpoint of the operator.

18. An adjustment device according to claim 17, wherein said target setting means is adapted to vary the current target adjustment state to a new target adjustment state, when the viewpoint detecting means detects that another position on the index mark is watched for at least a predetermined time.

19. An adjustment device according to claim 16, wherein said control means is adapted, once said target adjustment state is set by said target setting means, to continue the varying operation for the adjustment state of said adjustment means even if the viewpoint is changed thereafter.

20. An adjustment device according to claim 19, wherein said index mark is composed of a scale indicating the adjustment range of said adjustment means by gradations, and the current adjustment state and the target adjustment state are displayed on said scale.

21. An adjustment device according to claim 20, wherein said adjustment means comprises zooming means, and the scale displayed on said monitor comprises an index mark on the image magnification.

22. An adjustment device according to claim 15, wherein said monitor comprises an electronic view finder.

23. An adjustment device comprising:

A) adjustment means for effecting a predetermined adjustment;

B) display means for displaying, on a monitor image area, an index mark indicating the adjustment range of said adjustment means;

C) a memory storing plural positions on said index mark and adjustment positions of said adjustment means corresponding to said plural positions;

D) viewpoint detecting means for detecting the position of the viewpoint of the operator in said monitor image area;

E) target setting means adapted, when a position of the viewpoint fixed on said index mark for at least a predetermined time is detected according to the output of said viewpoint detecting means, to read one of said adjustment positions from said memory corresponding to said position of the viewpoint and to set thus read position as the target position; and F) control means for moving the adjustment position of said adjustment means to the target position set by said target setting means with a predetermined speed, and, even in case the output of said viewpoint detecting means is varied during the movement of said adjustment means, continuing the movement of said adjustment means to said target position.

24. An adjustment device according to claim 23, wherein said control means is adapted, in case the output of said viewpoint detecting means is varied during the movement of said adjustment means, to renew said target position if another position on the index mark is watched anew for at least said predetermined time, and to continue the movement of said adjustment means to the current target position if the watch is less than said predetermined time.

25. An adjustment device according to claim 24, wherein said control means is adapted to display said target position and the current position of said adjustment means on said index mark.

26. An electronic device comprising:

display means for displaying, on a monitor image area, an index mark indicating the variable range of a zooming means for performing a zooming operation;

viewpoint detecting means for detecting a position of a viewpoint of an operator in said image area; and control means adapted, when said viewpoint is detected on said index mark by said viewpoint detecting means, for (i) setting a value corresponding to the detected viewpoint on the index mark as a target value of said zooming means, (ii) converting the target value into a driving amount, and (iii) driving said zooming means according to the driving amount.

27. A device according to claim 26, wherein said control means is adapted to set the target value of said zooming means corresponding to a position on the index mark where said viewpoint detecting means detects that the viewpoint remains fixed for at least a predetermined period of time.

28. A device according to claim 27, wherein said control means is adapted to effect a varying operation for the target value of said zooming means irrespective of the predetermined time for the detection of said viewpoint.

29. A device according to claim 26, wherein said monitor comprises an electronic viewfinder.

30. A device according to claim 26, wherein said index mark comprises a scale indicating said variable range, plural variable positions, and the current set position of said function.

31. A device according to claim 30, wherein said zooming means comprises a zoom lens driving means, and wherein said index mark indicates the variable range of the focal length of said zoom lens.

32. A device according to claim 30, further comprising a memory which stores information on said variable range and on the plural variable positions within said variable range, together with control values for setting functions respectively corresponding to said positions.

33. A control method for an adjustment device having an adjustment part for detecting a predetermined adjustment, comprising the steps of:

a step of displaying, on a monitor image area, an index mark indicating an adjustment range of said adjustment part;

a step of detecting a position of the view-point of the operator in the monitor image area;

a step of setting and storing a target adjustment value of the predetermined adjustment corresponding to the viewpoint on the index mark when the viewpoint is detected on the index mark in said detecting step; and a step of converting the target adjustment value into an adjustment amount of said adjustment part and driving said adjustment part according to the adjustment amount, even when the viewpoint is no longer on said index mark.

34. A method according to claims 33, further comprising a step of storing, in a memory, (i) plural adjustment states assumable by said adjustment part within said adjustment range and (ii) information on the positions on the index mark respectively corresponding to said adjustment states, in a mutually corresponding manner; and wherein said setting step is adapted to compare the position, on said index mark, of the viewpoint of the operator identified as fixed for at least a predetermined time in said detecting step, with the information on said positions stored in said memory, and to set an adjustment state corresponding to the information of a matching position as a target adjustment state.

35. A method according to claim 34, wherein said converting and driving step is adapted, in varying the adjustment state of said adjustment part to said target adjustment state, to effect said the variation with a predetermined speed irrespective of the position of the viewpoint of the operator.

36. A method according to claim 35, wherein said setting step is adapted to vary the current target adjustment state to a new target adjustment state, when another position on the index mark is watched for at least a predetermined time.

37. A method according to claim 34, wherein said converting and driving step is adapted, once said target adjustment state is set in said setting step, to continue the varying operation for the adjustment state of said adjustment part even if the viewpoint is changed thereafter.

38. A method according to claim 37, wherein said index mark comprises a scale indicating the adjustment range of said adjustment part by gradations, and wherein the current adjustment state and the target adjustment state are displayed on said scale.

39. A method according to claim 38, wherein said adjustment part comprises zooming means, and wherein the scale displayed on said monitor comprises an index mark on the image magnification.

40. A method according to claim 33, wherein said monitor comprises an electronic view finder.

* * * * *

UNITED STATES PATENT AND TRADEMARK OFFICE
CERTIFICATE OF CORRECTION

PATENT NO. : 6,181,377 B1
DATED : January 30, 2001
INVENTOR(S) : Takashi KOBAYASHI It is certified that error appears in the above-identified patent and that said Letters Patent is hereby corrected as shown below:

<u>Title page,</u>
Item [56], FOREIGN PATENT DOCUMENTS,
"1241511     9/1989     (JP)" should read -- 1-241511     9/1989     (JP). --.

<u>Column 9,</u>
Line 1, "stop" should read -- stops --.

<u>Column 11,</u>
Line 21, "driving" should read -- drawing --;
Line 27, "settable" should read -- variable --.

<u>Column 14,</u>
Line 27, "the" should be deleted.

Signed and Sealed this

Twentieth Day of August, 2002

Attest:

JAMES E. ROGAN
Attesting Officer      Director of the United States Patent and Trademark Office